US011353765B2

(12) United States Patent
Veenman et al.

(10) Patent No.: US 11,353,765 B2
(45) Date of Patent: Jun. 7, 2022

(54) FULL DISPLAY MIRROR WITH INTEGRATED COOLING SYSTEM

(71) Applicant: Gentex Corporation, Zeeland, MI (US)

(72) Inventors: Steven J. Veenman, Hudsonville, MI (US); Eric S. Sloterbeek, Hudsonville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 366 days.

(21) Appl. No.: 16/365,039

(22) Filed: Mar. 26, 2019

(65) Prior Publication Data

US 2019/0302563 A1 Oct. 3, 2019

Related U.S. Application Data

(60) Provisional application No. 62/648,784, filed on Mar. 27, 2018.

(51) Int. Cl.
| *G02F 1/153* | (2006.01) |
| *G02F 1/1333* | (2006.01) |
| *B60R 1/00* | (2022.01) |
| *B60R 1/04* | (2006.01) |
| *B60R 1/12* | (2006.01) |

(52) U.S. Cl.
CPC .............. *G02F 1/1533* (2013.01); *B60R 1/00* (2013.01); *B60R 1/04* (2013.01); *B60R 1/12* (2013.01); *G02F 1/133385* (2013.01); *B60R 2001/1215* (2013.01); *B60R 2300/20* (2013.01)

(58) Field of Classification Search
CPC .... B60R 1/00; B60R 1/04; B60R 1/12; B60R 2001/1215; B60R 2300/20; G02F 1/1533; G02F 1/133385; H05K 7/20972; H05K 7/20172; H05K 7/20563; F21V 29/83; G03B 21/16; G06F 1/20; H04N 1/00981
See application file for complete search history.

(56) References Cited

U.S. PATENT DOCUMENTS

| 4,320,937 A | 3/1982 | Schuwerk |
| 5,638,895 A | 6/1997 | Dodson |
| 5,719,714 A | 2/1998 | Ackeret |
| 6,201,471 B1 | 3/2001 | Jones |
| 7,397,461 B1 | 7/2008 | Graham |
| 8,106,567 B2 | 1/2012 | Eichhorner et al. |
| 9,019,090 B2 | 4/2015 | Weller et al. |
| 10,642,327 B1 * | 5/2020 | Silvanto ............ H05K 7/20209 |

(Continued)

FOREIGN PATENT DOCUMENTS

| CN | 205044633 U | * | 2/2016 |
| CN | 205044633 U | | 2/2016 |

(Continued)

*Primary Examiner* — Ephrem Z Mebrahtu
(74) *Attorney, Agent, or Firm* — Price Heneveld LLP; Brian James Brewer

(57) ABSTRACT

A rear view assembly includes a housing with a mount extending therefrom, a circuit board disposed on the housing, and an air mover proximate a heatsink. The air mover is configured to draw ambient air from an inlet into the housing. A channel in fluid communication with the air mover is configured to direct the air drawn into the housing across a top portion of the heatsink. The rear view assembly also includes an outlet in fluid connection with the channel, adjacent to the mount.

19 Claims, 20 Drawing Sheets

(56) References Cited

U.S. PATENT DOCUMENTS

| | | |
|---|---|---|
| 2004/0253130 A1 | 12/2004 | Sauciuc et al. |
| 2009/0201137 A1 | 8/2009 | Weller et al. |
| 2010/0080399 A1 | 4/2010 | Pfau et al. |
| 2014/0017075 A1 | 1/2014 | Wu |
| 2014/0139902 A1* | 5/2014 | Baumann .................. B60R 1/12 |
| | | 359/275 |
| 2014/0169017 A1 | 6/2014 | Song et al. |
| 2017/0120824 A1 | 5/2017 | Hallack et al. |
| 2018/0067279 A1 | 3/2018 | Veenman et al. |
| 2018/0251069 A1 | 9/2018 | LaCross et al. |

FOREIGN PATENT DOCUMENTS

| | | | | |
|---|---|---|---|---|
| JP | H09188195 A | | 7/1997 | |
| JP | 2008076661 A | * | 4/2008 | ............. G03B 21/16 |
| KR | 1020060067496 A | | 6/2006 | |

* cited by examiner

| Max Temperature | FDM 1.0 | FDM 2.0 w/o Blower | FDM 2.0 w/ Blower |
|---|---|---|---|
| Glass (Sim) | 55.8 | 53.4 | 45.5 |
| Case (Sim) | 51.0 | 56.8 | 47.9 |
| Glass (Exp) | 53.8, 54.0 | 52.3 | 46.5 |
| Case (Exp) | 50.3, 51.5 | 56.4 | 47.4 |

FIG. 12

|  | E01 | E02 | E03 | E04 | E05 | E06 |
|---|---|---|---|---|---|---|
| RPM: | NA | 7k | 10k | 7k | 10k | 10k |
| LED PWM: | 31k | 31k | 31k | 31k | 31k | 65,535 |
| Foam Seal: | NA | N | N | Y | Y | Y |
| Glass °C: | 52.3 | 46.5 | 44.9 | 45.0 | 42.6 | 54.1 |
| Case °C: | 56.4 | 47.4 | 44.8 | 44.8 | 42.1 | 53.3 |

FIG. 13

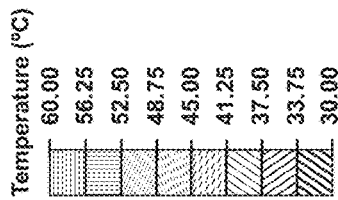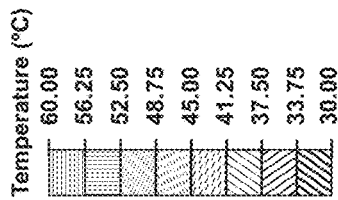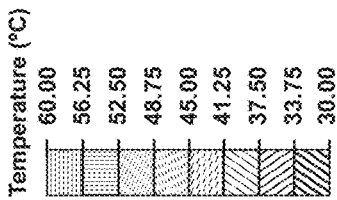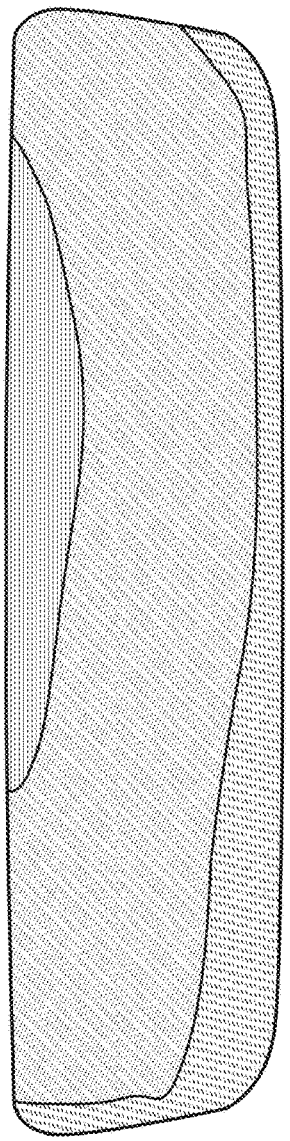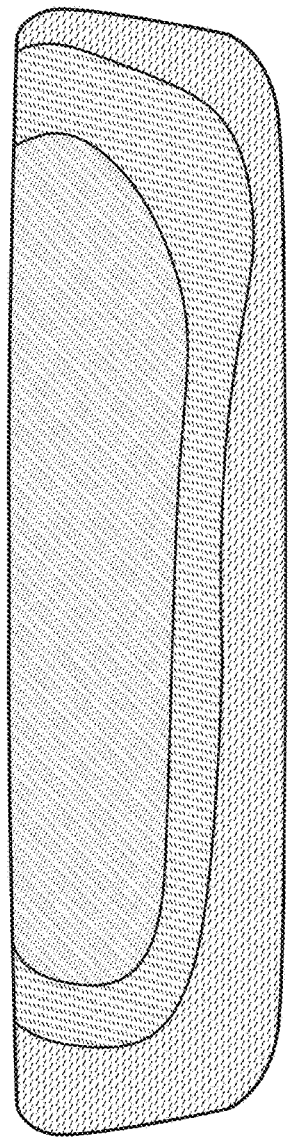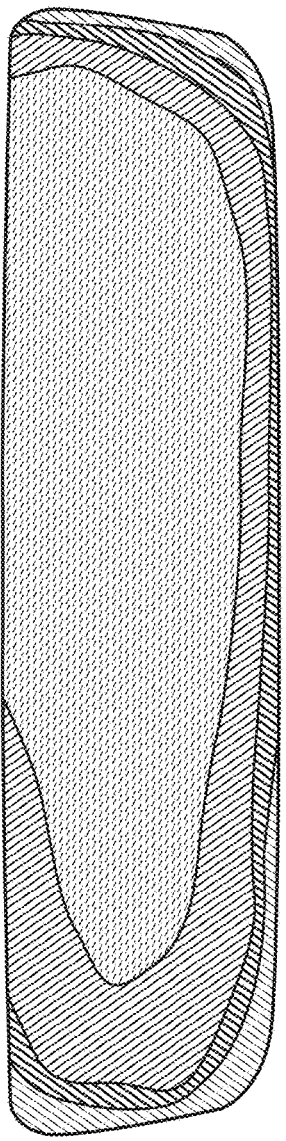
FIG. 14　　　FIG. 15　　　FIG. 16

FULL DISPLAY MIRROR WITH INTEGRATED COOLING SYSTEM

CROSS-REFERENCE TO RELATED APPLICATION

This application claims priority to and the benefit under 35 U.S.C. § 119(e) of U.S. Provisional Application No. 62/648,784, filed on Mar. 27, 2018, entitled "FULL DISPLAY MIRROR WITH INTEGRATED COOLING SYSTEM," the disclosure of which is hereby incorporated herein by reference in its entirety.

FIELD OF THE DISCLOSURE

The present disclosure generally relates to a rear view assembly, and more particularly to full display mirror with an integrated cooling system.

SUMMARY OF THE DISCLOSURE

According to one aspect of the present disclosure, a rear view assembly includes a housing with a mount extending therefrom, a circuit board disposed on the housing, and an air mover proximate a heatsink. The air mover is configured to draw ambient air from an inlet into the housing. A channel in fluid connection with the air mover is configured to direct the air drawn into the housing across a top portion of the heatsink and a light emitting diode (LED) printed circuit board. The rear view assembly also includes an outlet in fluid communication with the channel, adjacent to the mount.

According to another aspect of the present disclosure, a rear view assembly includes a housing with an electro-optic assembly, a display module, a circuit board disposed on the housing, and an air mover proximate a heatsink. The air mover is configured to draw ambient air from an inlet into the housing. A channel in fluid communication with the air mover is configured to direct the air drawn into the housing across a top portion of the heatsink. The rear view assembly also includes an outlet in a rear wall of the housing.

According to yet another aspect of the present disclosure, a rear view assembly includes a housing having an electro-optic assembly and a display module. A circuit board is disposed within the housing. The rear view assembly also includes an air mover proximate a heatsink. The air mover is configured to draw ambient air from an inlet into the housing. The rear view assembly also includes a channel defined by flanges extending from an inside surface of the housing and flanges defined by a support bracket within the housing. The channel is in fluid communication with the air mover and configured to direct the air drawn into the housing across a top portion of the heatsink.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 12 is a table showing temperature values for various components of different full display mirror assemblies;

FIG. 13 is a table showing performance values for a cooling system of the present disclosure;

FIG. 14 is a front elevational view of a thermal image of rear view assembly of the present disclosure;

FIG. 15 is a front elevational view of a thermal image of rear view assembly of the present disclosure;

FIG. 16 is a front elevational view of a thermal image of rear view assembly of the present disclosure;

DETAILED DESCRIPTION

Figure 1A:
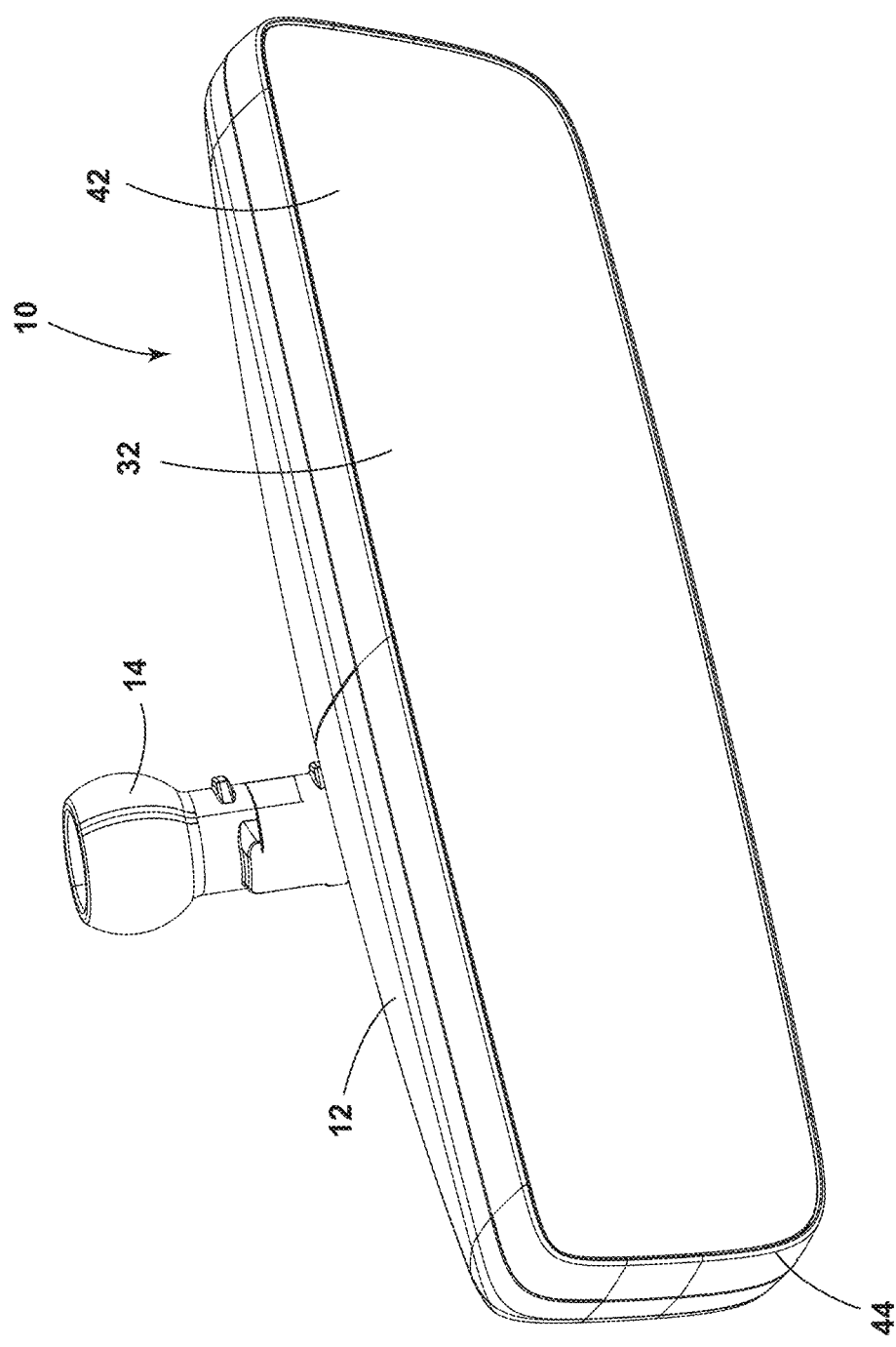
FIG. 1A is a front perspective view of a rear view assembly incorporated with a cooling system of the present disclosure.

The present illustrated embodiments reside primarily in combinations of method steps and apparatus components related to a rear view assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1A. Unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1A-19, reference numeral 10 generally designates a rear view assembly having a cooling system 11. The rear view assembly 10 also includes a housing 12 with a mount 14 extending therefrom. A circuit board assembly 16 is disposed on the housing 12, and an air mover 20 is proximate a heatsink 54. The air mover 20 is configured to draw ambient air from an inlet 22 into the housing 12. A channel 24 is in fluid connection with the air mover 20 and is configured to direct the air drawn into the housing 12 across a top portion of the heatsink 54. The rear view assembly 10 also includes an outlet 30 in fluid connection with the channel 24, adjacent to the mount 14.

With reference again to FIG. 1A, the rear view assembly 10 is generally configured for use inside of a vehicle. The mount 14 may be operably coupled with a windscreen button that is coupled with an inside surface of a vehicle windscreen. Alternatively, the mount 14 may be operably coupled with a vehicle headliner. It will be understood that the rear view assembly 10 as set forth herein may be used with a single ball mount, two ball mount, or other pivoting assembly, and that the housing 12 may take on a variety of shapes and constructions. The rear view assembly 10 also includes a glass substrate 32. The glass substrate 32 may be a single panel of glass having transmissive and/or reflective qualities. Alternatively, the glass substrate 32 may include an electro-optic assembly 42. The electro-optic assembly 42 may include an electrochromic assembly as set forth in commonly assigned U.S. Pat. Nos. 6,239,898 and 6,597,489, the contents of which are incorporated by reference herein in their entirety. It will also be understood that the electro-optic assembly 42 as set forth herein may take on a variety of shapes and constructions. The glass substrate 32 is positioned in the housing 12 between a top wall 34, bottom wall 35, and first and second side walls 36, 37, respectively. The internal components of the rear view assembly 10 are positioned between the glass substrate 32 and a rear wall 38 of the housing 12.

Figure 1B:
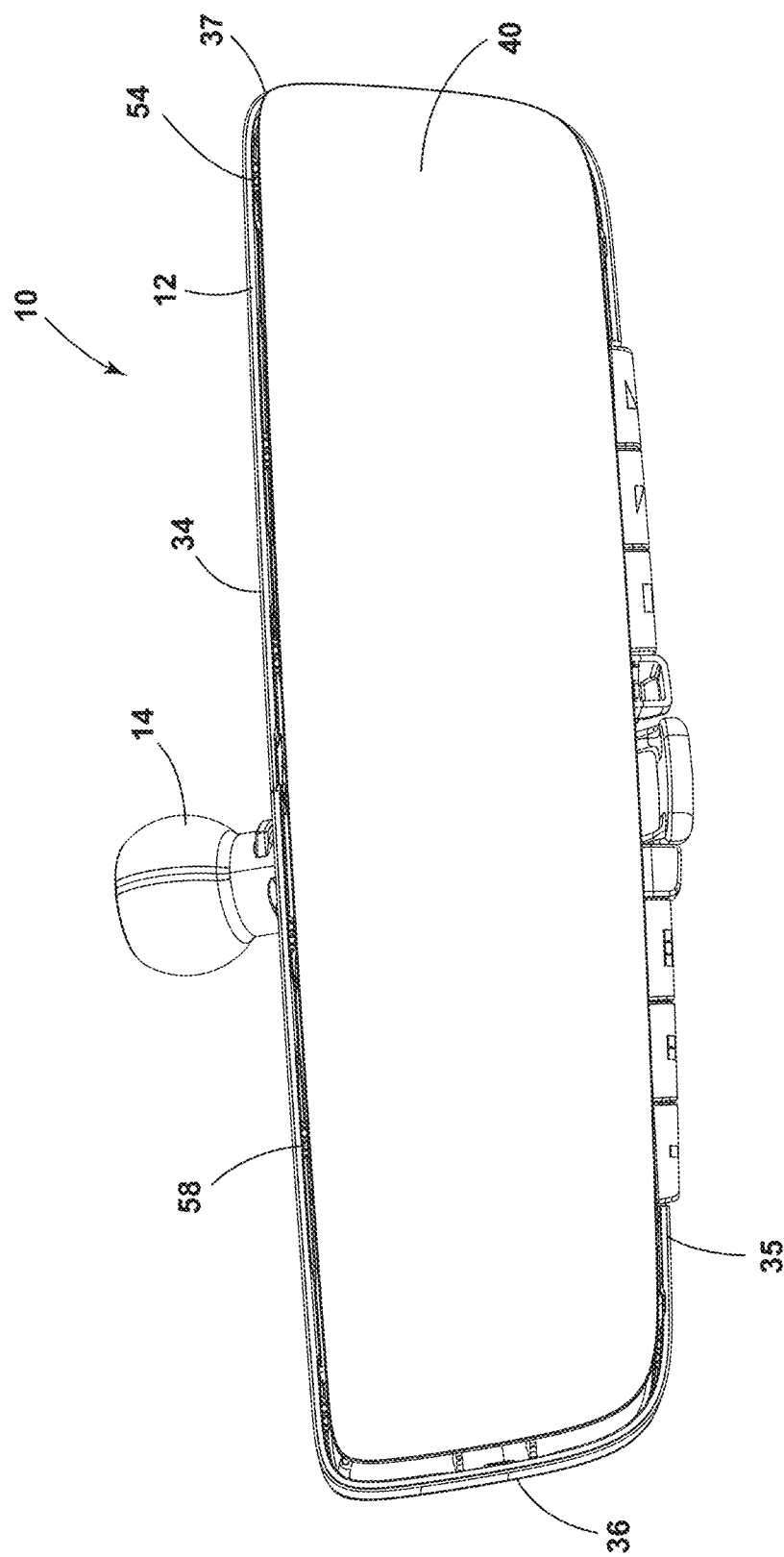
FIG. 1B is a front perspective view of a rear view assembly with components removed to expose the display module.

With reference now to FIG. 1B, the illustrated rear view assembly 10 includes a display module 40 disposed behind the glass substrate 32. Thermal loading may be increased for rear view assemblies 10 that have a full display mirror (FDM) construction. This is because some FDM constructions include a display module 40 that displays an external scene or internal view of an image or video taken from inside or outside of the vehicle by an imager. The FDM may include a high speed processor that generates higher thermal loads when the FDM is in use. The display module 40 may generate excessive heat that may call for more aggressive heat management techniques. The imager that generates images for the display module 40 may be positioned anywhere in or on the vehicle.

Figure 2A:
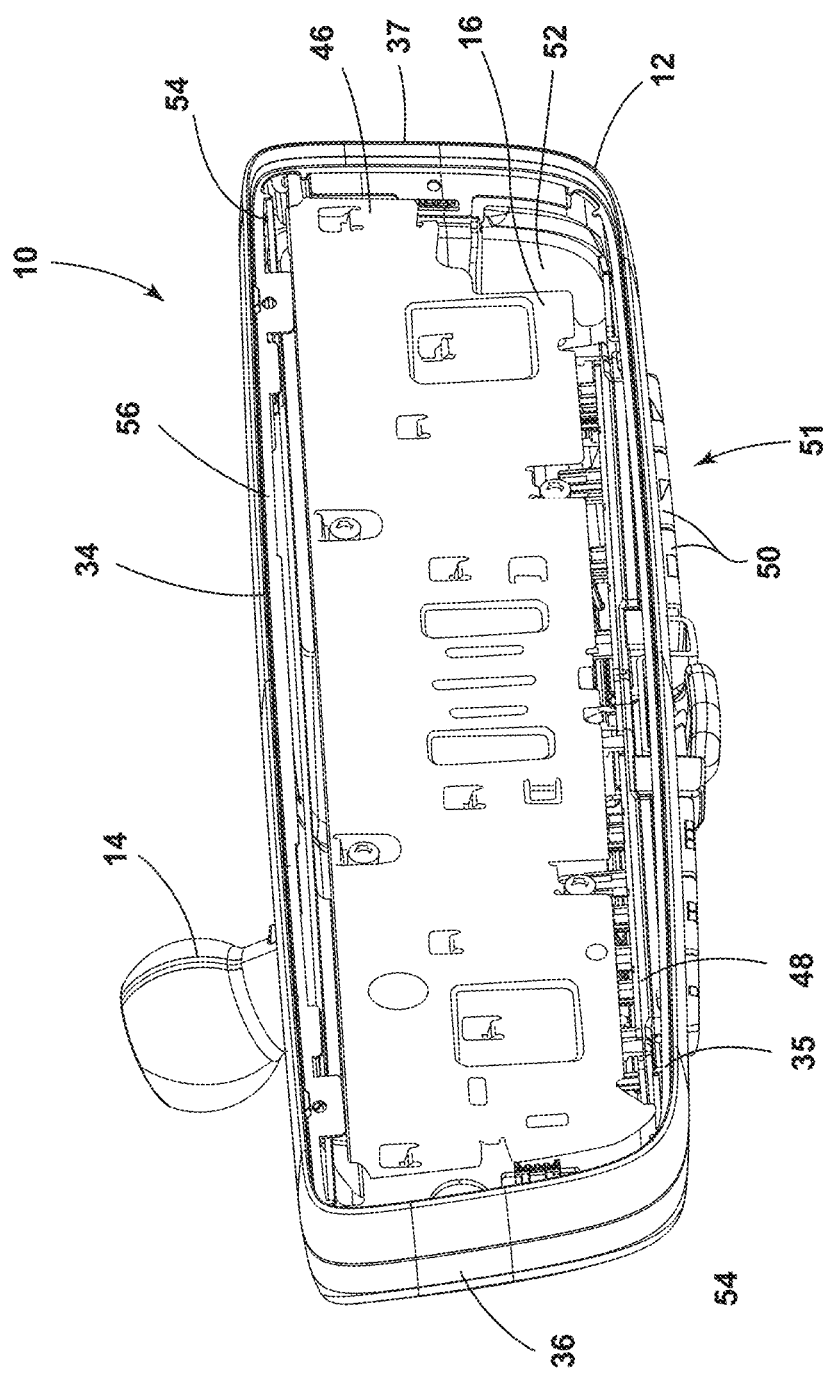
FIG. 2A is a front perspective view of a rear view assembly having a cooling system of the present disclosure with the glass substrate, display, and light guide removed.

With reference now to FIG. 2A, the rear view assembly 10 is generally illustrated with the display module 40, the electro-optic assembly 42, light guide, and bezel 44 removed from the rear view assembly 10. Removal of these components exposes a radio frequency (RF) shield 46 and a lower travel guide 48 for buttons 50 of a lower button assembly 51 that are disposed on the bottom wall 35 of the housing 12, and the circuit board assembly 16. The circuit board assembly 16 includes a primary circuit board 52, which is disposed behind the RF shield 46 and a secondary circuit board 56 disposed above the RF shield 46. The heatsink 54 includes a vertical portion disposed behind the primary circuit board 52 and is positioned to draw heat from the primary circuit board 52 during normal operation of the primary circuit board 52. The heatsink 54 also includes an upper horizontal portion that draws heat away from the secondary circuit board 56 and which extends across a top portion of the rear view assembly 10 below the top wall 34 of the housing 12. The secondary circuit board 56 is generally aligned in an orthogonal configuration relative to the primary circuit board 52 for edge lit displays. However, it is also contemplated that the secondary (LED) circuit board 56 could be disposed directly behind the display module 40. Consequently, thermal loading that is generated by the primary circuit board 52 and the secondary circuit board 56 may be concentrated near an upper portion of the rear view assembly 10. As a result, the air mover 20 is configured to move air across the top portion of the rear view assembly 10 to cool the heatsink 54, primary circuit board 52, and secondary circuit board 56.

Figure 2B:
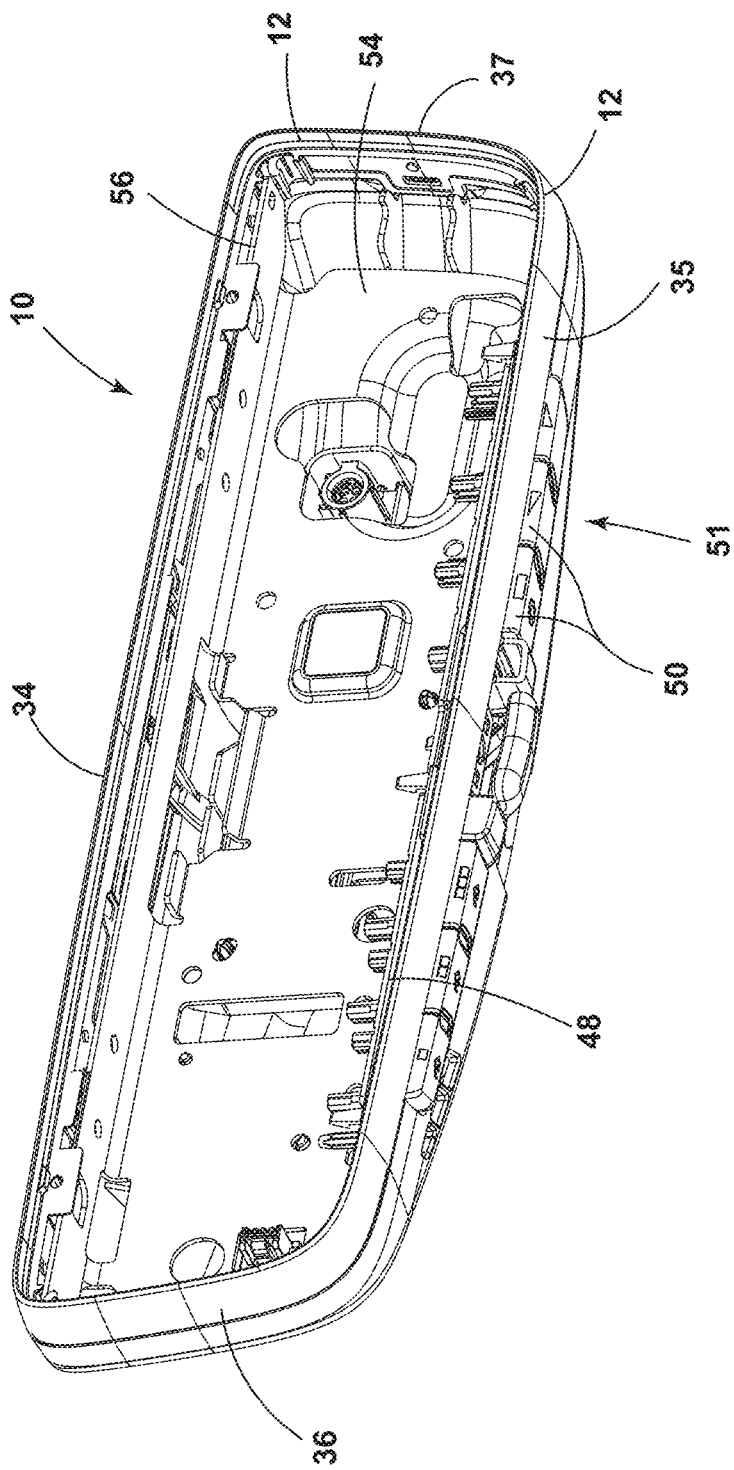
FIG. 2B is a front perspective view of a rear view assembly having a cooling system of the present disclosure with the primary circuit board and display module removed.

Referring now to FIG. 2B, which illustrates the heatsink 54 after removal of the primary circuit board 52 and RF shield 46, the secondary circuit board 56 is shown adjacent the upper horizontal portion of the heatsink 54. The lower travel guide 48 is also shown. The lower travel guide 48 aids in aligning the buttons 50 with switches on a bottom side of the primary circuit board 52 (FIG. 2A).

Figure 2C:
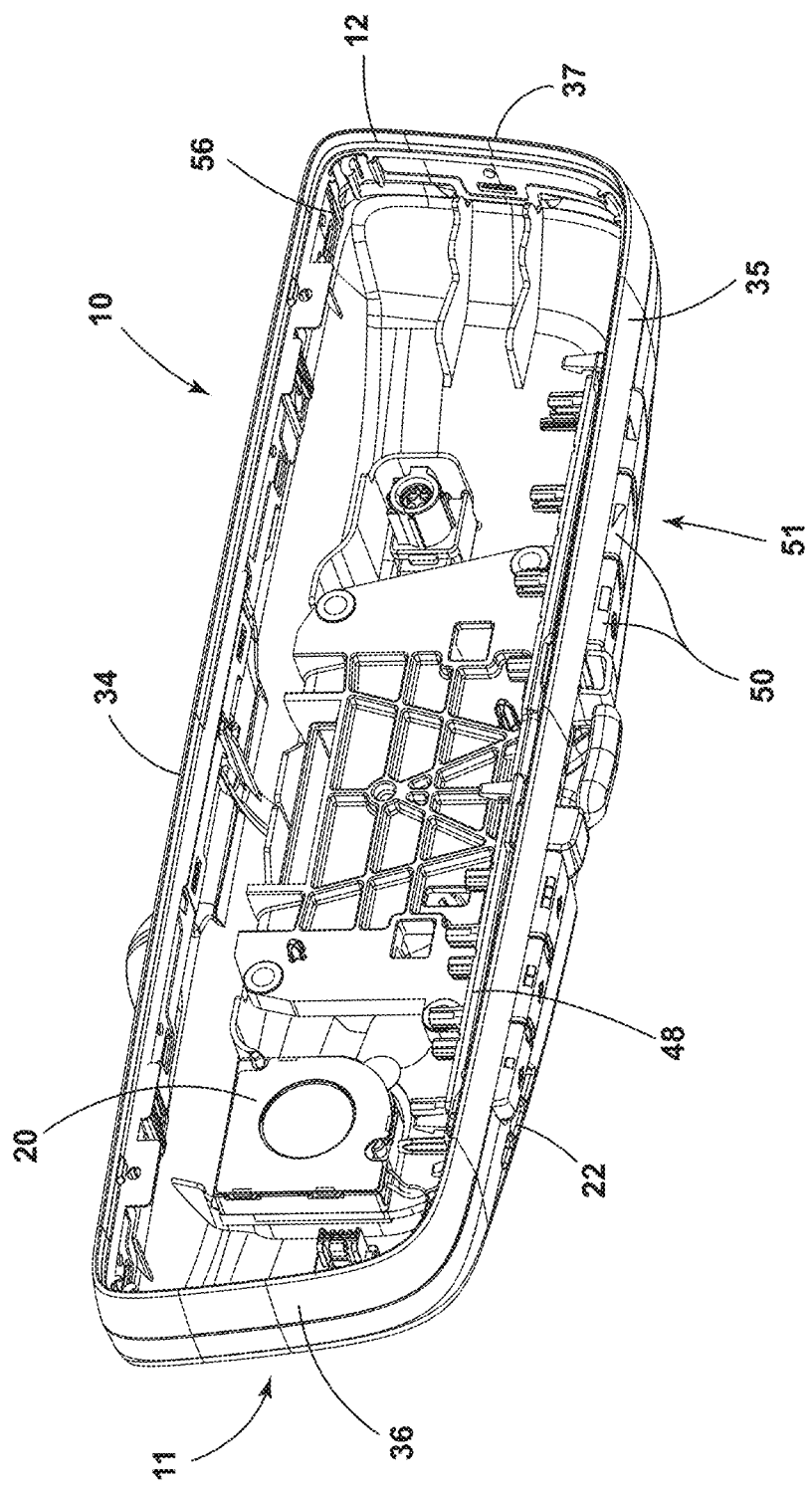
FIG. 2C is a front perspective view of a rear view assembly having a cooling system of the present disclosure with the display module and heatsink removed.

With reference to FIG. 2C, the rear view assembly 10 is illustrated with the heatsink 54 removed including the electro-optic assembly 42 which shows the placement of the air mover 20 inside the rear view assembly 10. In the illustrated embodiment, the air mover 20 is in the form of a blower configured to draw air into the inlet 22 defined in the bottom wall 35 of the housing 12. The example shown in FIGS. 2B and 2C shows the inlet 22 being defined by several apertures that extend through the bottom wall 35 of the housing 12. However, the inlet 22 may be disposed anywhere on the housing 12, such as through a lower portion of the housing 12, and may take on a variety of configurations. Air is drawn into the blower through the inlet 22 and pushed toward the channel 24 which is adjacent the primary and secondary circuit boards 52, 56, as well as the heatsink 54. It will be understood that the air mover 20 may be any device configured to draw air or push air within a predefined space and is not limited to a blower. Also, it will be understood that the air mover 20 may be configured to move air throughout the rear view assembly 10 in manners other than that specifically disclosed herein. As illustrated, the air mover 20 is substantially small and may include a relatively thin cross-section so that the air mover 20 takes up minimal space within the housing 12.

Figure 3:
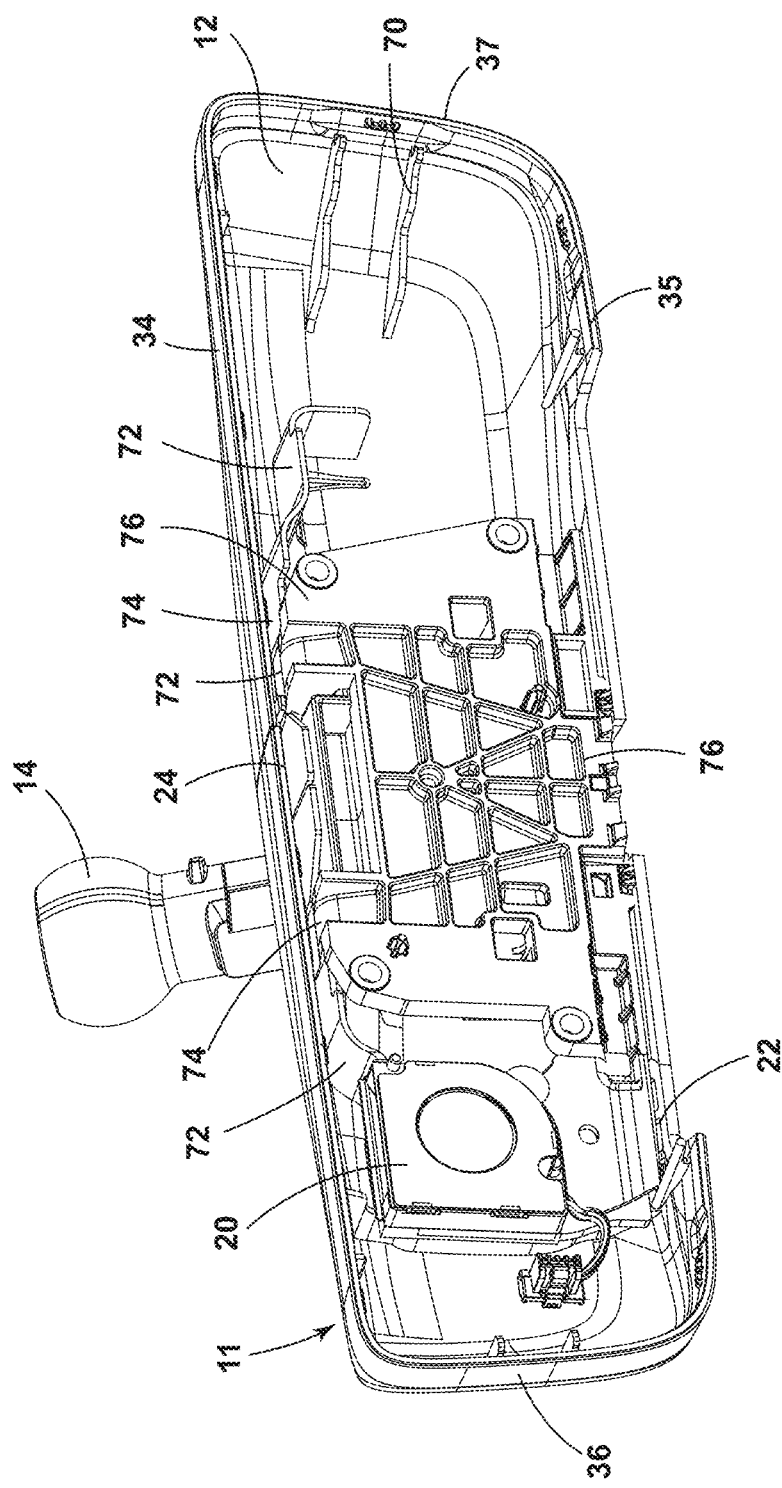
FIG. 3 is a front perspective view of a rear view assembly having a cooling system of the present disclosure with components including a glass substrate, printed circuit board, and display device removed.
Figure 4:
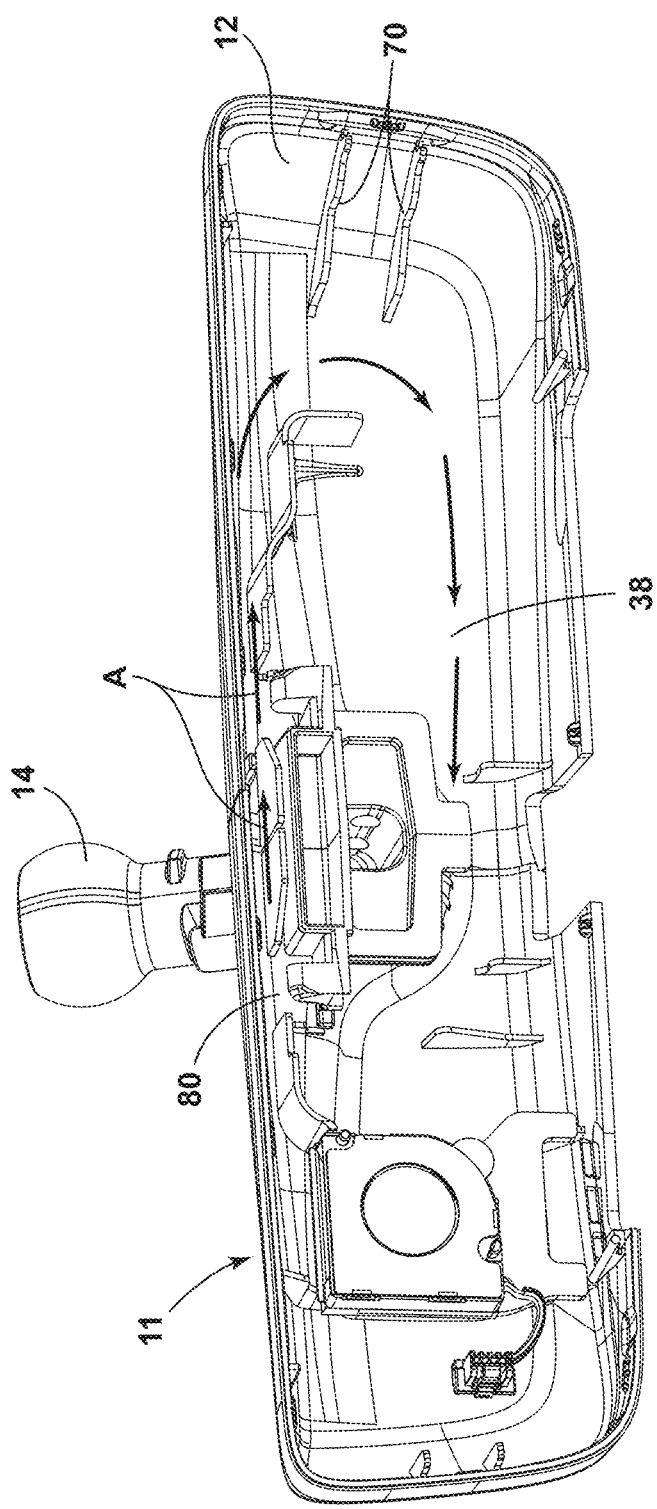
FIG. 4 is a front perspective view of the rear view assembly of FIG. 2A of the present disclosure with the an internal bracket removed and showing the general direction of air flow.
Figure 5:
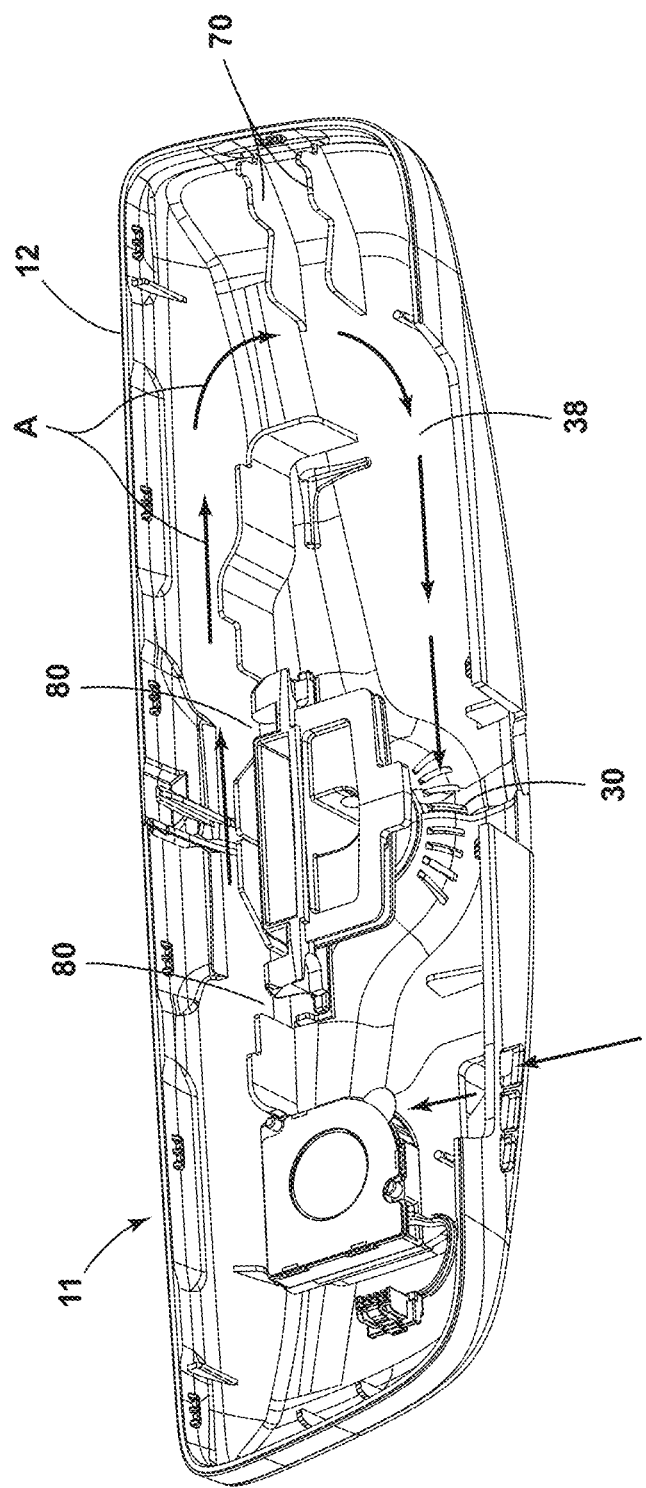
FIG. 5 is a bottom perspective view of an air mover and housing of a rear view assembly of the present disclosure also showing the general direction of air flow.
Figure 6:
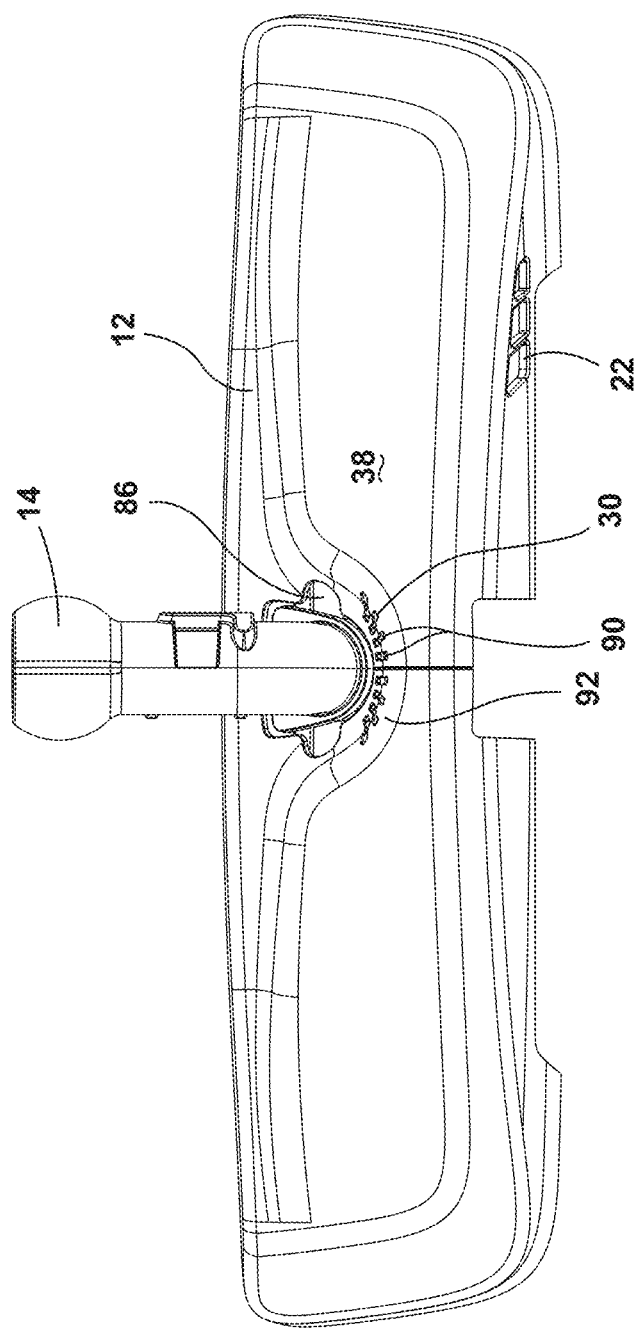
FIG. 6 is a rear elevational view of a housing and mount of a rear view assembly of the present disclosure.
Figure 7:
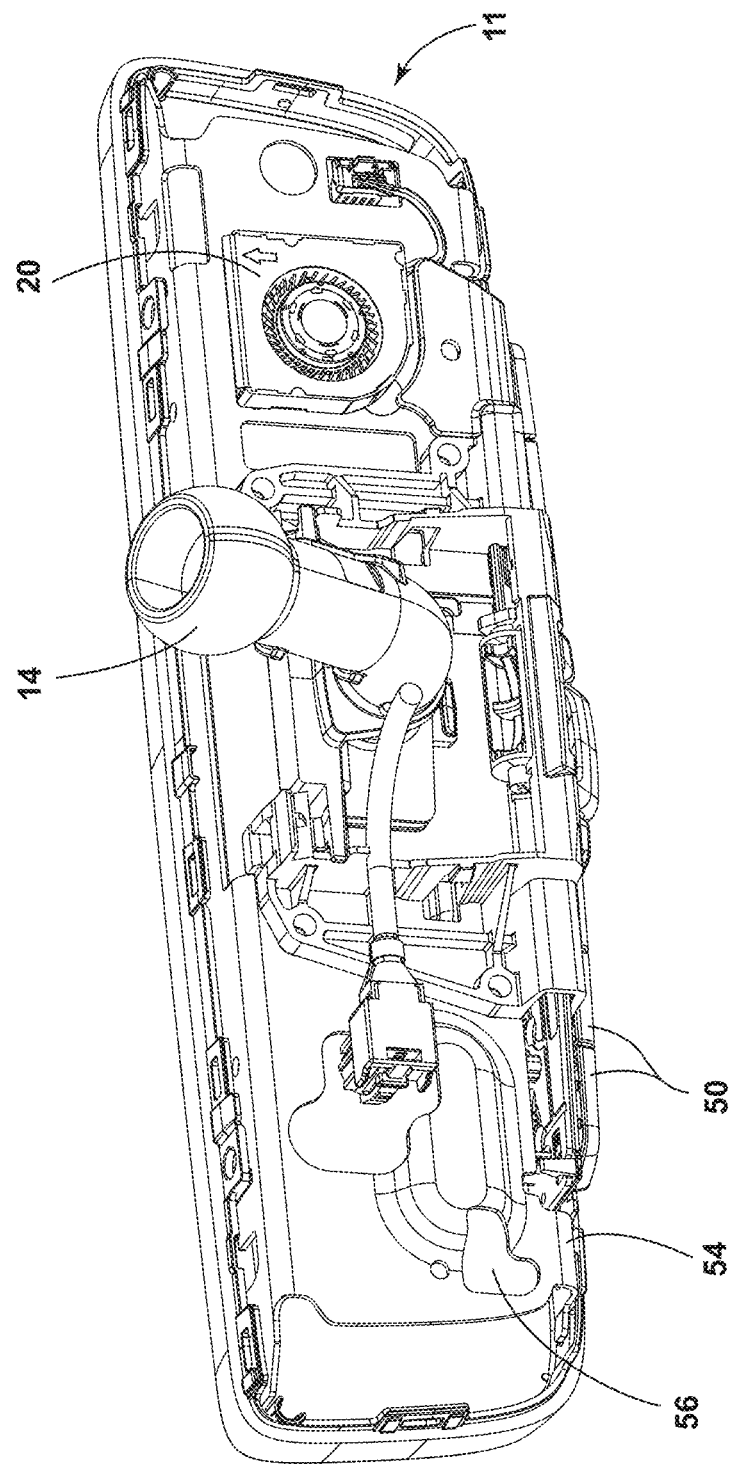
FIG. 7 is a first side rear perspective view of a rear view assembly with a cooling system of the present disclosure with the housing removed to show the air mover.
Figure 8:
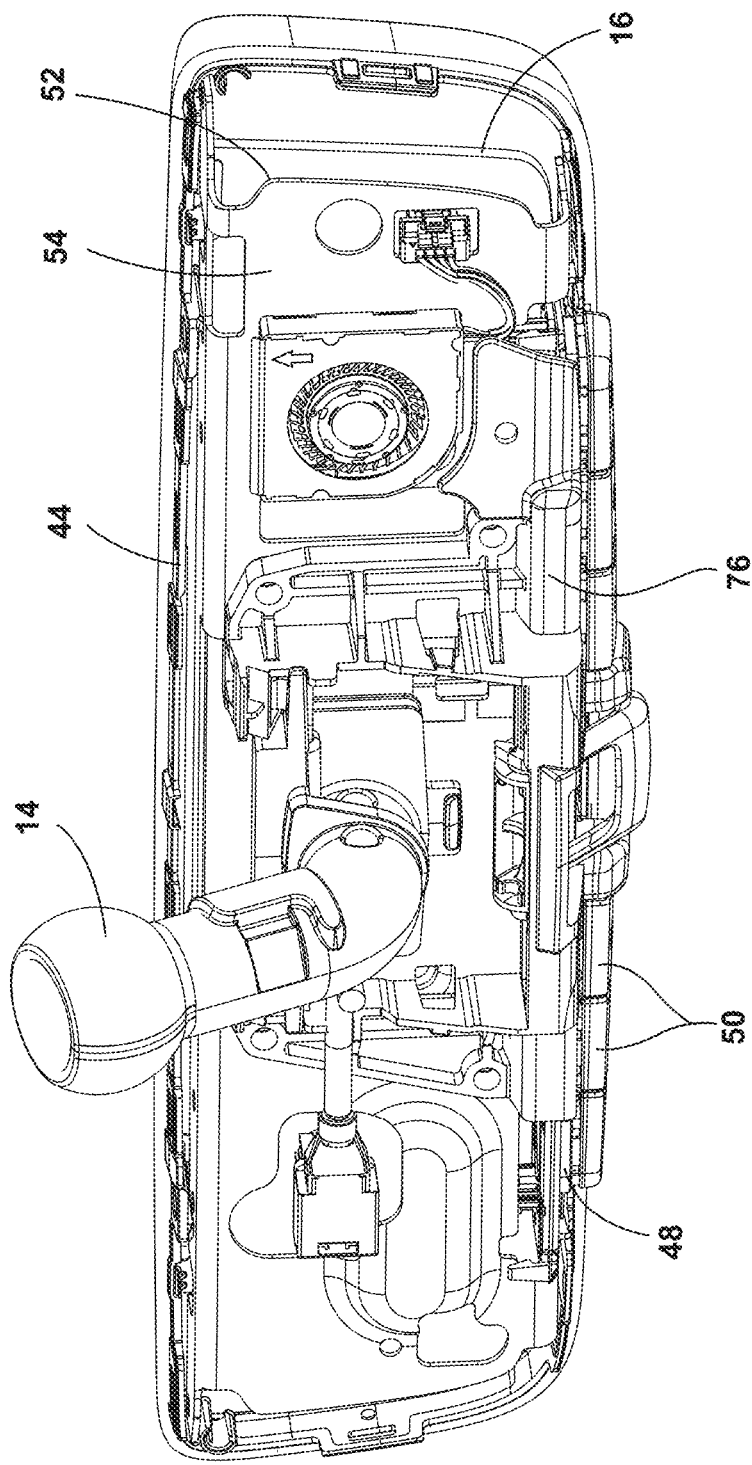
FIG. 8 is a second side rear perspective view of a rear view assembly with a cooling system of the present disclosure with the housing removed to show the air mover.

With reference to FIG. 3, the bottom wall 35, top wall 34, first and second side walls 36, 37, and rear wall 38 of the housing 12 together define an inside surface of the housing 12, within which the components of the rear view assembly 10 reside. The inside surface includes side flanges 70 configured to provide some additional structural integrity to the rear view assembly 10. In addition, the inside surface of the housing 12 includes a plurality of upper flanges 72 configured to help direct air that is being moved by the air mover 20. The upper flanges 72 act in concert with bracket flanges 74 of a support bracket 76 that is operably coupled with the mount 14. Accordingly, the upper flanges 72 and bracket flanges 74 together define the channel 24 through which ambient air is moved inside the rear view assembly 10.

With reference now to FIGS. 4-8, once the support bracket 76 is removed, gaps 80 in the channel 24 can be seen between the upper flanges 72 inside the housing 12. As previously noted, when the support bracket 76 is positioned in the housing 12, the support bracket 76, along with the upper flanges 72 of the housing 12 define the channel 24 through which air is moved across the rear view assembly 10. The mount 14 extends into the rear wall 38 of the housing 12 at a mount aperture 86. It will be understood that the mount 14 may also be coupled to the rear wall 38 of the housing 12 or may take on another configuration. Air that is drawn in through the inlet 22 at the bottom wall 35 of the housing 12 is pushed in the direction of arrows A across a top portion of the heatsink 54 and secondary circuit board 56. As the air moves through the channel 24 defined between the upper flanges 72, support bracket 76, and the top wall 34 of the housing 12, the air has the effect of cooling both the heatsink 54 and the primary and secondary circuit boards 52, 56. The warmed air is then directed toward and exhausted out of the housing 12 through the outlet 30 as well as the gap between the mount 14 and the mount aperture 86. In another instance, this mount aperture 86 alone is used as the outlet 30. As illustrated, the outlet 30 includes a plurality of vents 90 defined in the rear wall 38 of the housing 12 proximate the mount aperture 86. The vents 90 in the illustrated figures are defined through a bulbous portion 92 of the rear wall 38 of the housing 12 proximate the mount aperture 86. It will be understood that other configurations for the outlet 30 are also contemplated. It will also be understood that the direction of air flow drawn in through the inlet 22 is not an airtight path. Rather, the direction of air flow has been specifically configured to pass through a variety of openings within the housing 12 as set forth herein and illustrated in FIGS. 9-11.

Figure 9:
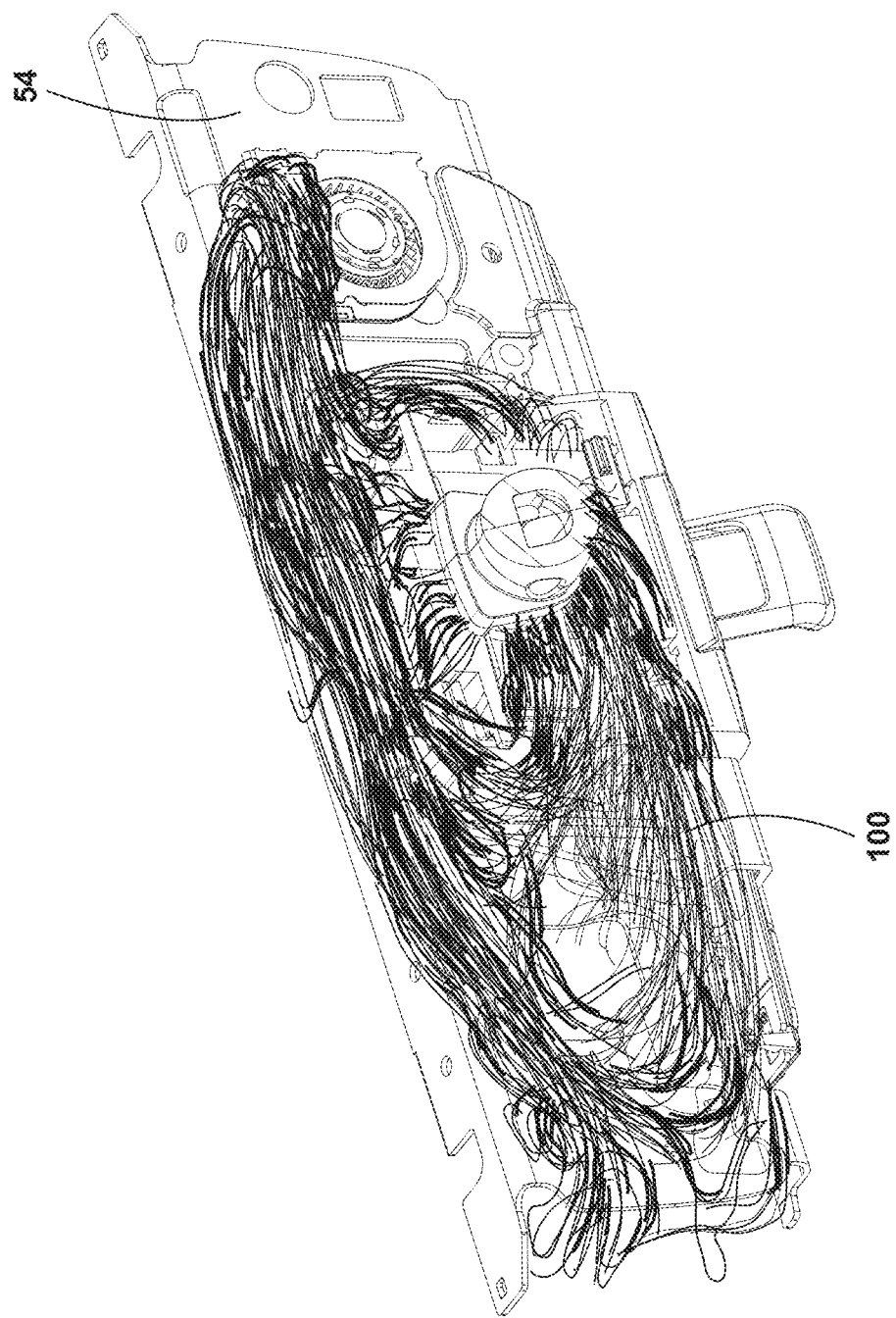
FIG. 9 is a rear perspective view of a rear view assembly with the housing removed and showing air flow lines moving across a heatsink and printed circuit boards of the present disclosure.
Figure 10:
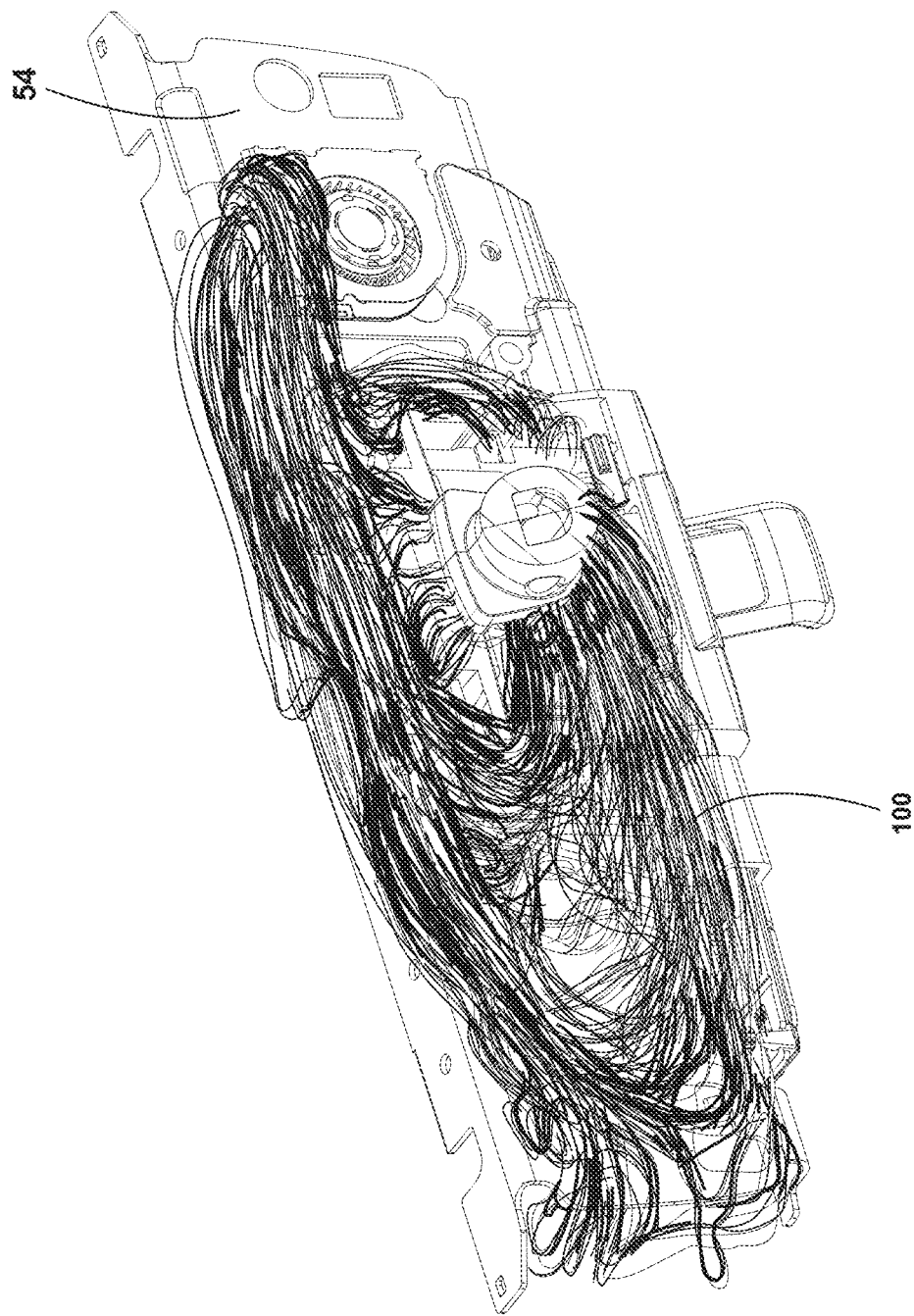
FIG. 10 is another rear perspective view of a rear view assembly with the housing removed and showing air flow lines moving across a heatsink and printed circuit boards of the present disclosure.
Figure 11:
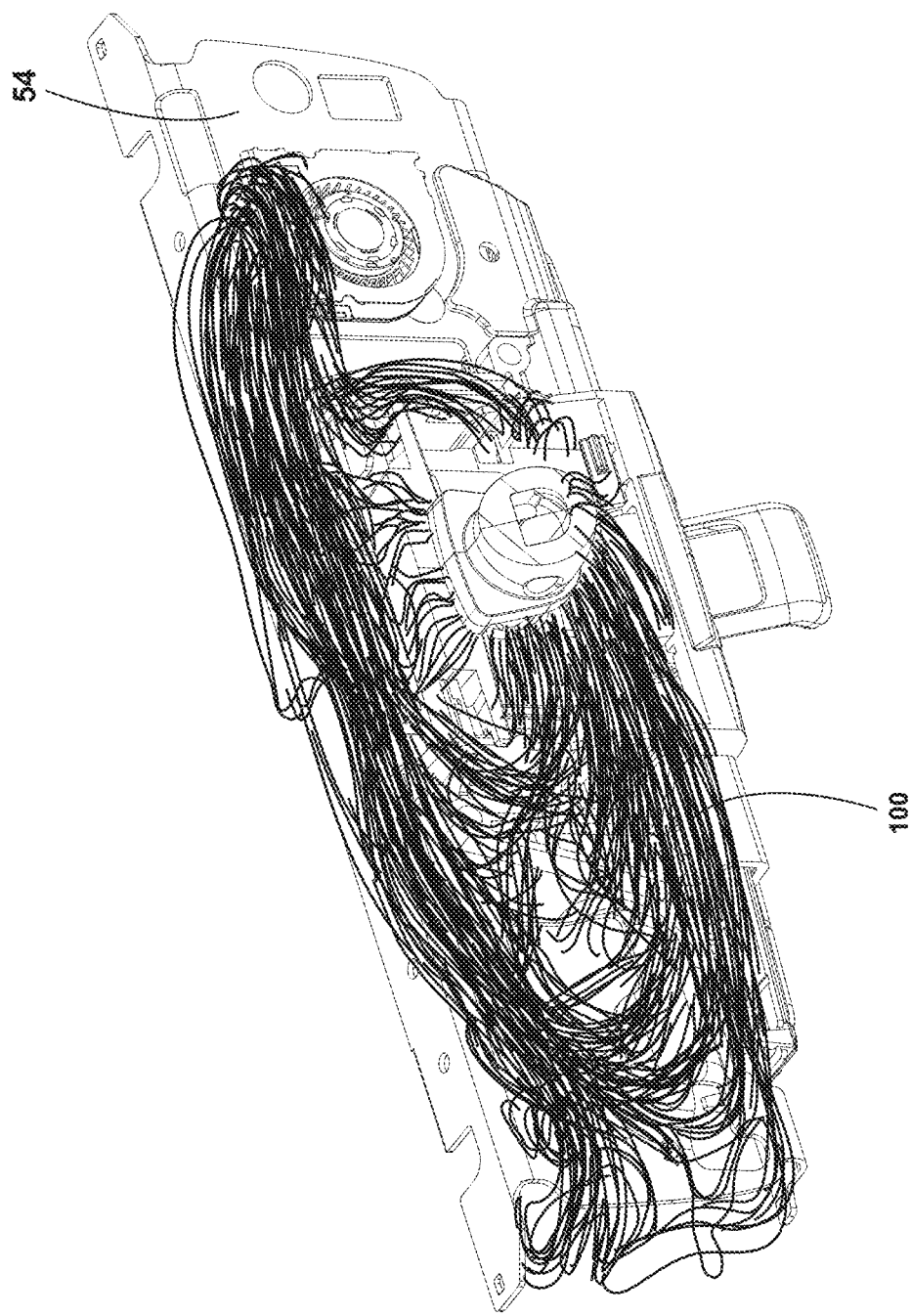
FIG. 11 is another rear perspective view of a rear view assembly with the housing removed and showing air flow lines moving across a heatsink and printed circuit boards of the present disclosure.

With reference now to FIGS. 9-11, several airflow models are shown where a backside of the heatsink 54 is illustrated with air lines 100 caused by the blower. Here, the housing 12 and several other components have been removed so that the air lines of each airflow model shown in FIGS. 9-11 can be seen. As illustrated, air that is drawn in through the inlet 22 (FIG. 2C) is blown mostly across a top portion of the rear view assembly 10 through the flow channel 24. The air is then circulated on the backside of the heatsink 54 and primary circuit board 52 until the warmed air leaves through the outlet 30 proximate the mount 14. As can be understood in FIG. 9, the air lines 100 illustrated inside the housing 12 circulate through various openings and slots defined within the housing 12 such that the channel 24 does not move all of the air but does move a substantial portion of it. This feature is by construction and is generally configured to allow air drawn in through the inlet 22 to cool specific areas of the printed circuit board assembly 16 and heatsink 54 that may have higher thermal loading. The air, which has been warmed by the heatsink 54 as well as by the primary and secondary circuit boards 52, 56, is then exhausted out through the outlet 30 to the environment.

The tables shown in FIGS. 12 and 13 illustrate the temperatures of the glass as simulated for the full display mirror 1.0, the full display mirror 2.0 without a blower, and the full display mirror 2.0 with a blower. As is readily understood for both the glass substrate 32 and the housing 12 (case), cooling occurs as a result of the addition of the blower, which is shown in the third column. Because the components inside the rear view assembly 10, including the printed circuit board assembly 16, heatsink 54, and display module 40, operate at a cooler state with the blower, longevity of the rear view assembly 10 and operability of the device is increased. The table of FIG. 13 illustrates six experiments. In the first experiment (E01), the revolutions of the air mover 20 were not measured, but the LED pulse modulation was measured at 31,000. No foam seal was applied and the glass temperature was 52.3° C. while the housing 12 or case temperature was 56.4° C. Various features were modified in experiments E02-E06. Notably, as the revolutions per minute increase, the temperature of the glass substrate 32 and the housing 12 (case) tends to decrease. Moreover, application of the blower potentially accommodates a higher LED pulse with modulation, as shown in experiment E06. This table clearly illustrates that the additional blower has a positive impact on cooling the components within the rear view assembly 10.

With reference now to FIG. 14, a full display mirror 1.0 without a blower is illustrated. The temperature of an upper portion of the glass substrate 32 is as high as 55.82° C. FIG. 15 illustrates a second generation full display mirror 2.0 without a blower which operates at 53.35° C. Operation of the full display mirror 2.0 is already cooler than operation of the full display mirror 1.0, however, when a blower is added to the full display mirror 2.0 (as shown in FIG. 16) the operating temperature of the glass substrate 32 is lowered even more, to 45.49° C. This is a significant cooling of the glass substrate 32 which allows for better functionality of the glass substrate 32 and components disposed within the rear view assembly 10. The significant cooling also provides the option for faster processors, which generate even more heat, but which can be dealt with by the addition of the air mover 20.

Figure 17:
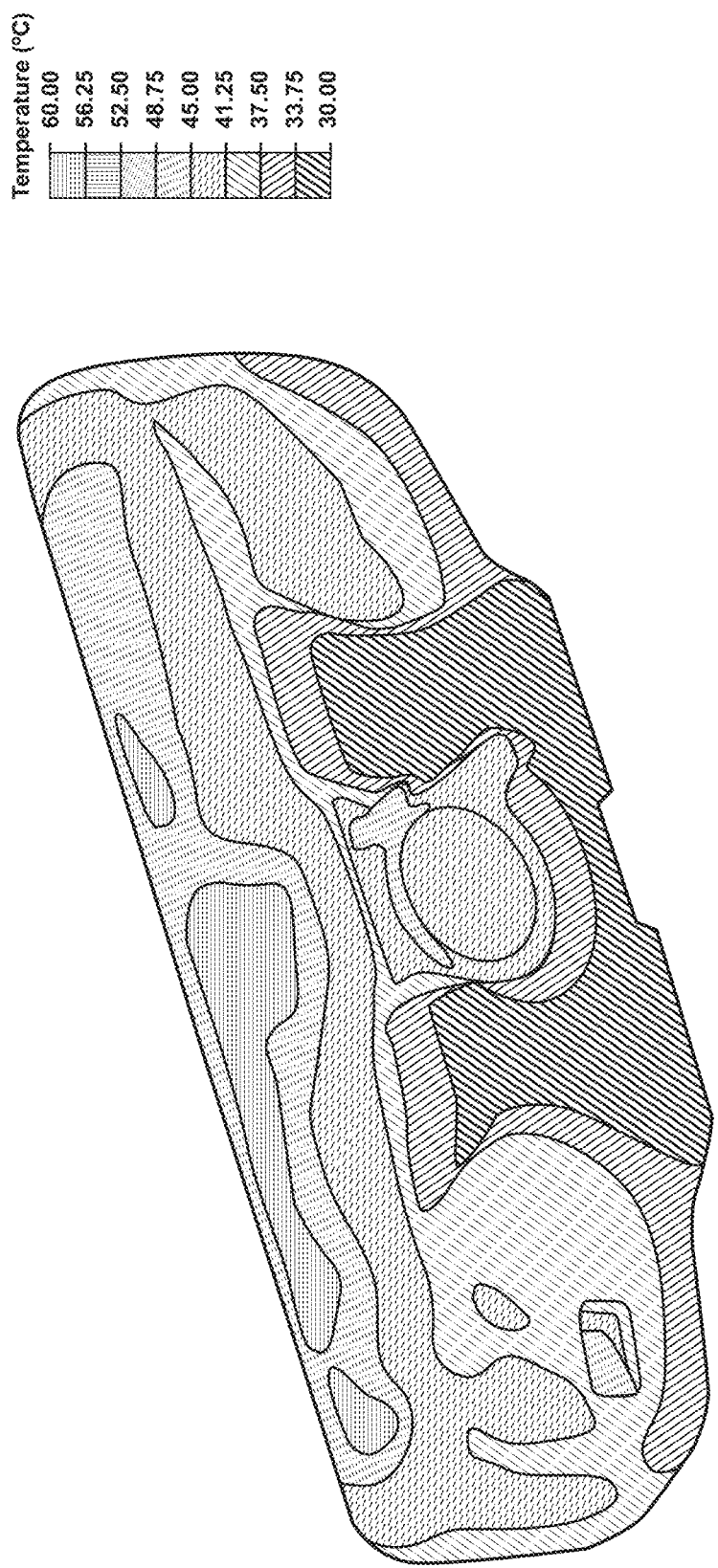
FIG. 17 is a rear top perspective view of a thermal image of a rear view assembly of the present disclosure.
Figure 18:
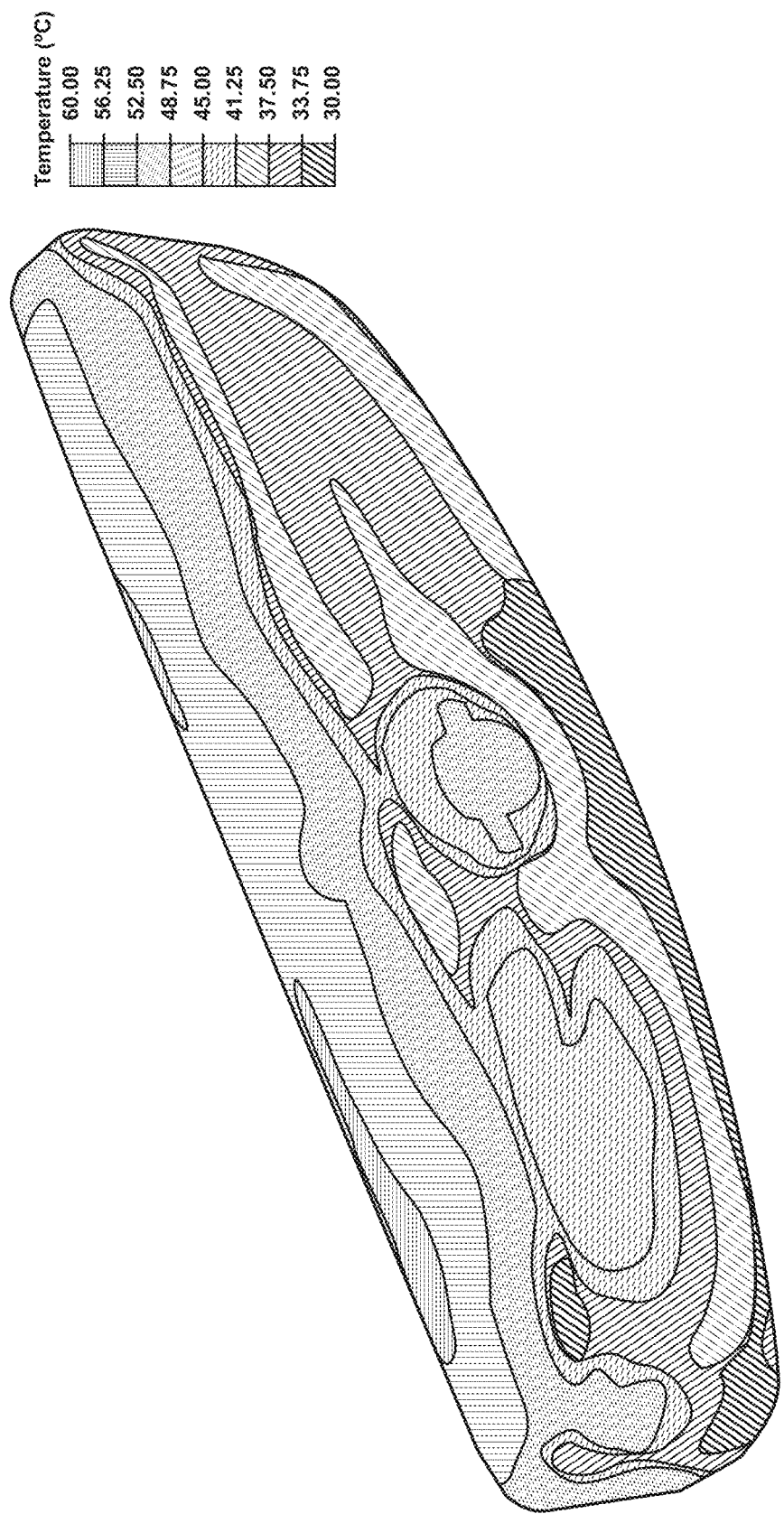
FIG. 18 is a rear top perspective view of a thermal image of a rear view assembly of the present disclosure.
Figure 19:
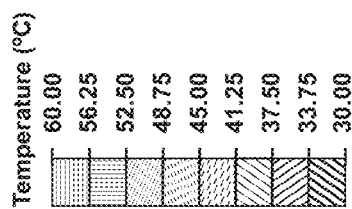
FIG. 19 is a rear top perspective view of a thermal image of a rear view assembly of the present disclosure.
Figure 19:
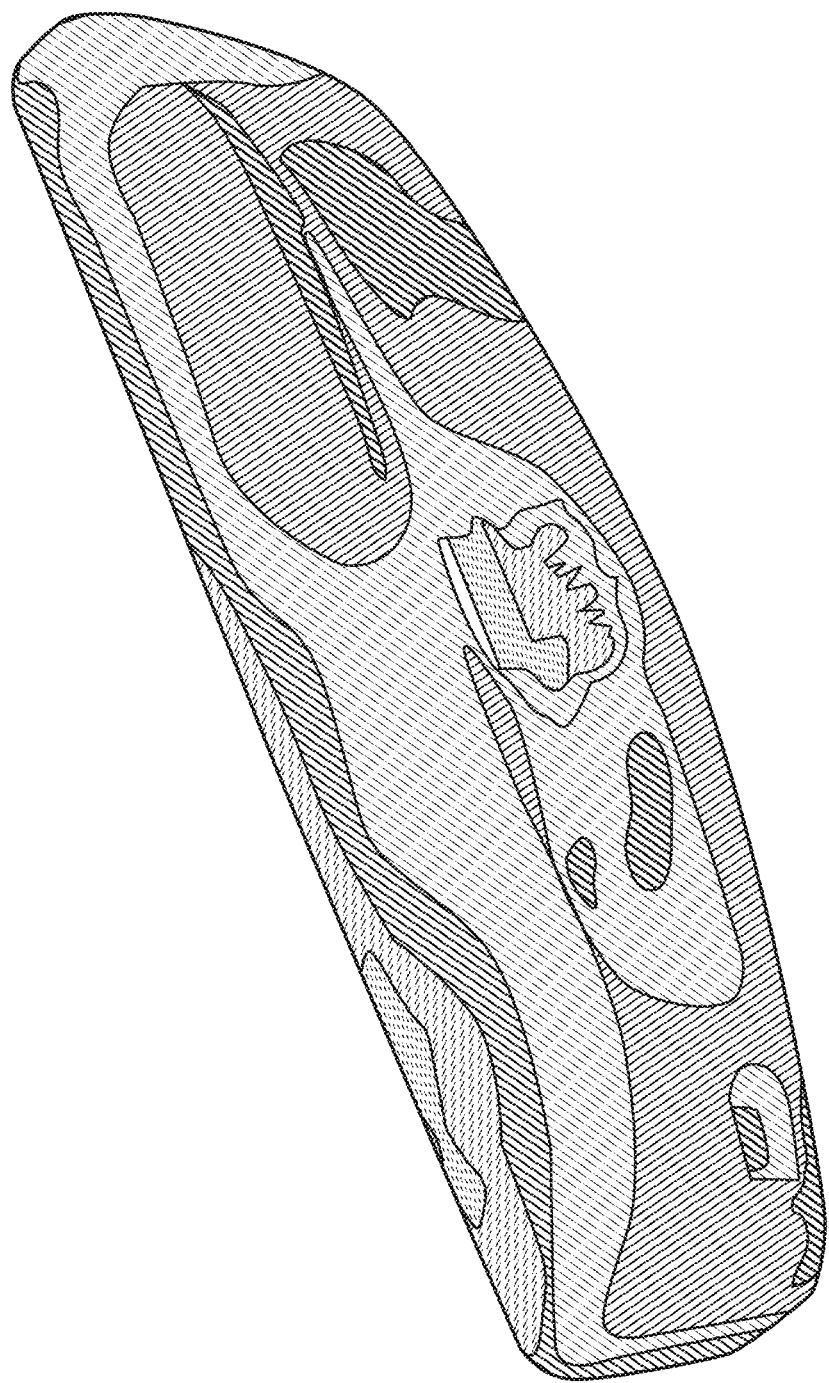

With regard to FIGS. 17-19, the temperatures at the housing 12 react similarly. FIG. 17 illustrates temperatures of the housing 12 for the full display mirror 1.0. Various temperatures taken across the top wall 34 of the housing 12 range from 50.02° C. to 50.95° C. The full display mirror 2.0 is warmer at the housing 12 than the full display mirror 1.0 and includes temperatures of 56.69° C. and 56.83° C. taken at the top wall 34 of the housing 12. When a blower is added to the full display mirror 2.0, the temperature at the top wall 34 of the housing 12 is reduced to temperatures between 47.86° C. and 39.29° C. Clearly, application of the blower to the full display mirror results in a cooler glass substrate 32 as well as a cooler housing 12.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A rear view assembly comprising:
   a housing including a mount extending therefrom;
   a circuit board disposed within the housing;
   an air mover proximate a heatsink, the air mover configured draw ambient air from an inlet into the housing;
   a channel defined between internal flanges and an inside surface of the housing, wherein the channel is in fluid communication with the air mover and configured to direct the air drawn into the housing across a top portion of the heatsink; and
   an outlet in fluid connection with the channel and adjacent to the mount, wherein the air is expelled between the mount and a chin of the housing.

2. The rear view assembly of claim 1, further comprising:
   a display device configured to display an image of an external scene of a vehicle.

3. The rear view assembly of claim 1, wherein the inlet is disposed below the air mover and adjacent to a lower button assembly.

4. The rear view assembly of claim 1, wherein the air mover is coupled with the heatsink.

5. The rear view assembly of claim 1, further comprising:
   an electro-optic assembly operable between generally clear and generally darkened states.

6. The rear view assembly of claim 1, further comprising:
   vents that are in fluid communication with the channel, wherein the vents are positioned proximate a mount aperture defined through the housing.

7. The rear view assembly of claim 1, wherein the air mover and the channel are in fluid communication with the inlet defined through a lower portion of the housing.

8. A rear view assembly comprising:
   a housing having an electro-optic assembly and a display module;
   a circuit board disposed within the housing;
   an air mover proximate a heatsink, the air mover configured to draw ambient air from an inlet into the housing;
   a channel defined by flanges extending from a rear wall of the housing and in fluid communication with the air mover, the channel configured to direct the air drawn into the housing across a top portion of the heatsink; and
   an outlet in the rear wall of the housing.

9. The rear view assembly of claim 8, further comprising:
   vents that are in fluid communication with the channel, wherein the vents are positioned proximate a mount aperture defined through the housing.

10. The rear view assembly of claim 8, wherein the electro-optic assembly is operable between generally clear and generally darkened states.

11. The rear view assembly of claim 8, further comprising:
    a display device configured to display an image of an external scene of a vehicle.

12. The rear view assembly of claim 8, wherein the air mover and the channel are in fluid communication with the inlet defined through a lower portion of the housing.

13. The rear view assembly of claim 8, wherein the air mover is coupled with the heatsink.

14. A rear view assembly comprising:
    a housing having an electro-optic assembly and a display module;
    a circuit board disposed within the housing;
    an air mover proximate a heatsink, the air mover configured to draw ambient air from an inlet into the housing;
    a channel defined by flanges extending from an inside surface of the housing and flanges defined by a support bracket within the housing, wherein the channel is in fluid communication with the air mover and configured to direct the air drawn into the housing across a top portion of the heatsink.

15. The rear view assembly of claim 14, wherein the electro-optic assembly is operable between generally clear and generally darkened states.

16. The rear view assembly of claim 14, further comprising:
    vents that are in fluid communication with the channel, wherein the vents are positioned proximate a mount aperture defined through the housing.

17. The rear view assembly of claim 14, further comprising:
    a display device configured to display an image of an external scene of a vehicle.

18. The rear view assembly of claim 14, wherein the air mover and the channel are in fluid communication with the inlet defined through a lower portion of the housing.

19. The rear view assembly of claim 14, wherein the air mover is coupled with the heatsink.

* * * * *